United States Patent
Nellen et al.

(10) Patent No.: US 10,576,810 B2
(45) Date of Patent: Mar. 3, 2020

(54) OPEN ROOF CONSTRUCTION FOR A VEHICLE

(71) Applicant: INALFA ROOF SYSTEMS GROUP B.V., Venray-Oostrum (NL)

(72) Inventors: Marcel Johan Christiaan Nellen, Merselo (NL); Rainer Gerhard Jungling, Dusseldorf (DE)

(73) Assignee: Inalfa Roof Systems Group B.V., Oostrum (NL)

( * ) Notice: Subject to any disclaimer, the term of this patent is extended or adjusted under 35 U.S.C. 154(b) by 0 days.

(21) Appl. No.: 16/037,676

(22) Filed: Jul. 17, 2018

(65) Prior Publication Data

US 2019/0023111 A1 Jan. 24, 2019

(30) Foreign Application Priority Data

Jul. 24, 2017 (EP) .................................. 17182757

(51) Int. Cl.
*B60J 7/043* (2006.01)
*B60J 10/90* (2016.01)
(Continued)

(52) U.S. Cl.
CPC ............ *B60J 7/0435* (2013.01); *B60J 7/024* (2013.01); *B60J 7/043* (2013.01); *B60J 10/82* (2016.02); *B60J 10/90* (2016.02)

(58) Field of Classification Search
CPC . B60J 7/024; B60J 7/043; B60J 7/0435; B60J 7/047; B60J 7/057
(Continued)

(56) References Cited

U.S. PATENT DOCUMENTS

| 4,699,421 A | 10/1987 | Schaetzler et al. |
| 5,069,501 A | 12/1991 | Baldwin et al. |
(Continued)

FOREIGN PATENT DOCUMENTS

| DE | 4238945 C1 | 11/1993 |
| DE | 19635145 C1 | 10/1997 |
(Continued)

OTHER PUBLICATIONS

European Search Report dated Jan. 2, 2018, for corresponding European Patent Application No. 17182757.9, filed Jul. 24, 2017.

*Primary Examiner* — Dennis H Pedder
(74) *Attorney, Agent, or Firm* — Steven M. Koehler; Westman, Champlin & Koehler, P.A.

(57) ABSTRACT

Open roof construction for a vehicle comprises a roof opening in a stationary roof part, a panel which by an operating mechanism is movable between a closed position in which it closes the roof opening and an open position in which the panel is moved rearwards to a position at least partially above a part of the stationary roof part behind the roof opening. The operating mechanism comprises a rear moving assembly for guiding and supporting the panel. The open roof construction further comprises seals that are positioned in the roof opening in the region of roof opening edges and which are intended for cooperation with the panel, wherein the rear moving assembly is constructed such that, in the open position of the panel, part of it has come into engagement with the seal that is positioned in the roof opening in the region of the rearward roof opening edge.

20 Claims, 3 Drawing Sheets

(51) Int. Cl.
*B60J 7/02* (2006.01)
*B60J 10/82* (2016.01)

(58) Field of Classification Search
USPC .......................................... 296/216.02–216.05
See application file for complete search history.

(56) References Cited

U.S. PATENT DOCUMENTS

| | | | |
|---|---|---|---|
| 5,531,501 A | 7/1996 | Nabuurs | |
| 6,174,024 B1 * | 1/2001 | Kronseder | ............. B60J 7/0435 296/216.03 |
| 6,827,392 B2 | 12/2004 | Doncov et al. | |
| 6,890,022 B2 | 5/2005 | Doncov et al. | |
| 6,945,590 B2 | 9/2005 | Doncov et al. | |
| 9,931,919 B2 | 4/2018 | Nellen et al. | |
| 2004/0104604 A1 | 6/2004 | Doncov et al. | |
| 2004/0104605 A1 | 6/2004 | Doncov et al. | |
| 2004/0145219 A1 | 7/2004 | Doncov et al. | |
| 2017/0151863 A1 | 6/2017 | Nellen et al. | |

FOREIGN PATENT DOCUMENTS

| | | | | |
|---|---|---|---|---|
| DE | 102009052451 A1 | | 5/2011 | |
| DE | 102009052622 A1 | * | 5/2011 | ............. B60J 7/024 |
| DE | 102014014174 A1 | | 3/2016 | |
| DE | 102015121533 A1 | | 6/2017 | |
| EP | 0271987 A1 | * | 6/1988 | ............ B60J 7/0435 |
| EP | 3173271 A1 | | 5/2017 | |
| GB | 2209795 A | | 5/1989 | |
| WO | 02096685 A2 | | 12/2002 | |

* cited by examiner

OPEN ROOF CONSTRUCTION FOR A VEHICLE

BACKGROUND

The discussion below is merely provided for general background information and is not intended to be used as an aid in determining the scope of the claimed subject matter.

Aspects of the invention relate to an open roof construction for a vehicle, comprising a roof opening in a stationary roof part, a panel which by an operating mechanism is movable between a closed position in which it closes the roof opening and an open position in which the panel is moved rearwards to a position at least partially above a part of the stationary roof part behind the roof opening, wherein the operating mechanism comprises a rear moving assembly for guiding and supporting the panel, wherein the open roof construction further comprises seals that are positioned in the roof opening in the region of roof opening edges and which are intended for cooperation with the panel.

It is noted that within the context of the present disclosure the "stationary roof part" also may be an adjacent part of the roof which can move independently, such as an adjacent panel with its own operating mechanism.

In a known open roof construction of such a type the panel generally is moved and guided by the rear moving assembly which cooperates with a rear part of the panel and by a forward mechanism (such as for example a combination of stationary curved track cooperating with a guide shoe fixed to a forward part of the panel) which both define elements of the operating mechanism (which, in addition, may comprise further elements, such as for example a drive member or slide which is responsible for activating the elements of the operating mechanism).

One important factor influencing the stability of the panel in its open position is the spacing between the locations where the rear moving assembly and the forward mechanism engage the panel. In a known open roof construction these locations will have to remain between the seals. When the panel moves towards the open position, part of the rear moving assembly slides along the panel and closes in on the forward mechanism, reducing the said spacing and thus the stability. The amount in which the panel can be moved to an open position, and thus the amount of roof opening that can be freed, is determined by the minimum stability required.

One possible solution for providing sufficient stability when increasing the amount in which the panel frees the roof opening, would be to move part of the rear moving assembly over and beyond the seal that is positioned in the roof opening in the region of the rearward roof opening edge without engaging it. However, this would require a substantial lifting height of the panel and therefore would increase the so-called package height of the construction. Moreover, and even more importantly, the panel in its open position would be located at a substantial height above the stationary roof. In modern open roof designs, however, it is a desire to position the panel in its open position as close as possible to the stationary roof part (among others because of aesthetics and aerodynamic reasons). Also, in the open position, such an increased height could lead to a more steep position of the panel, which is not favoured, however.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the Background.

An open roof construction is disclosed wherein the rear moving assembly is constructed such that, in the open position of the panel, part of the rear moving assembly has come into engagement with the seal that is positioned in the roof opening in the region of the rearward roof opening edge.

As a result it is possible to increase the spacing between the locations where the rear moving assembly and, for example, a forward mechanism engage the panel, such that for a given stability of the panel a larger amount of the roof opening may be freed in the open position of the panel, while positioning the panel as close as possible to the stationary roof part. Moreover, the engagement between said part and the seal may help in reducing or even eliminating disturbing (rattling) noises (for example resulting from vibrations). Further this also allows that the constructional height (packaging height) at the frontal end of the panel is reduced.

In one embodiment the rear moving assembly is constructed such that, in the open position of the panel, part of the rear moving assembly has deformed said seal relative to a situation in which said seal does not engage the panel. A situation in which said seal does not engage the panel means a situation in which the seal assumes its normal rest position in which it is not engaged by another member (other than the roof opening edge to which it may be connected). By allowing a deformation of the seal, a further reduction of the (vertical) distance between the panel and the stationary roof part is obtainable.

It is conceivable that the rear moving assembly is constructed such that the engagement between said part thereof and said seal is caused by a substantially linear movement of said part of the rear moving assembly towards said seal.

More preferably the rear moving assembly is constructed such that said linear movement occurs substantially orthogonally to a contact surface to be created between said part of the rear moving assembly and said seal as a result of such a linear movement. In such a manner wear of the seal (and of the part of the rear moving assembly engaging it) resulting from friction may be minimised.

It is noted, however, that also embodiments are conceivable in which said linear movement occurs non-orthogonally to a contact surface to be created between said part of the rear moving assembly and said seal as a result of such a linear movement.

In such a case, but also more generally, it is preferable that the part of rear moving assembly which will engage said seal first is provided with means for assuring a gradual engagement between said part and said seal. Such means, for example, may comprise at least one inclined, rounded or bevelled edge of said part of the rear moving assembly. These means prevent that the seal will be damaged when being engaged and deformed.

In one embodiment the rear moving assembly comprises a lever for guiding and supporting the panel, which lever can move in a longitudinal direction of the vehicle and can rotate around a transverse axis, said lever having a first end which can slide along a guide for defining its movement in the longitudinal direction and a second end provided with a sliding member which in a sliding manner engages a track which is part of the panel, wherein said part of the rear moving assembly (which engages the said seal) comprises the sliding member and/or the lever. However, if the rear moving assembly is provided with additional parts, also one of those parts may engage the seal.

It is conceivable that the rear moving assembly may be constructed such that the engagement between said part of the rear moving assembly and said seal is caused by a rotational movement of said part for assuring that at the start of the engagement the part of the rear moving assembly which engages said seal moves substantially orthogonally to a contact surface to be created between said part of the rear moving assembly and said seal as a result of such a rotational movement. Such a rotational movement is an alternative for the above mentioned linear movement (but it should be noted that a combination of both movements is possible too within the context of the present invention) which can lead to a smooth engagement of the seal.

When the rear moving assembly comprises a lever for guiding and supporting the panel, which lever can move in a longitudinal direction of the vehicle and can rotate around a transverse axis, said lever having a first end which can slide along a guide for defining its movement in the longitudinal direction and a second end provided with a sliding member which in a sliding manner engages a track which is part of the panel and said part of the rear moving assembly (which engages the seal) comprises the sliding member, it is conceivable that the track is shaped such that the sliding member, when sliding along said track, is rotated. As such the sliding movement of the sliding member along said track of the panel automatically leads to the desired rotation of the sliding member at the right moment and position. Also an appropriate manipulation of the panel at its leading end may cause or contribute to (part of) the desired rotation of the sliding member.

When, as an alternative, the rear moving assembly comprises a lever for guiding and supporting the panel, which lever can move in a longitudinal direction of the vehicle and can rotate around a transverse axis, said lever having a first end which can slide along a guide for defining its movement in the longitudinal direction and a second end provided with a sliding member which in a sliding manner engages a track which is part of the panel and said part of the rear moving assembly comprises the lever, it is conceivable that the guide along which the first end of the lever slides is shaped for causing the rotation of the lever. As such the sliding movement of the lever along said guide automatically leads to the desired rotation of the lever at the right moment and position.

Whereas in some cases said seal will be attached to the rearward roof opening edge (thus maximising the exposed roof opening in the open position of the panel), in other cases it is conceivable too that said seal is spaced from the rearward roof opening edge (thus being positioned slightly inward from the roof opening edge).

BRIEF DESCRIPTION OF THE DRAWINGS

Hereinafter aspects of the invention will be elucidated while referring to the drawings in which.

DETAILED DESCRIPTION OF THE ILLUSTRATIVE EMBODIMENT

Figure 1:
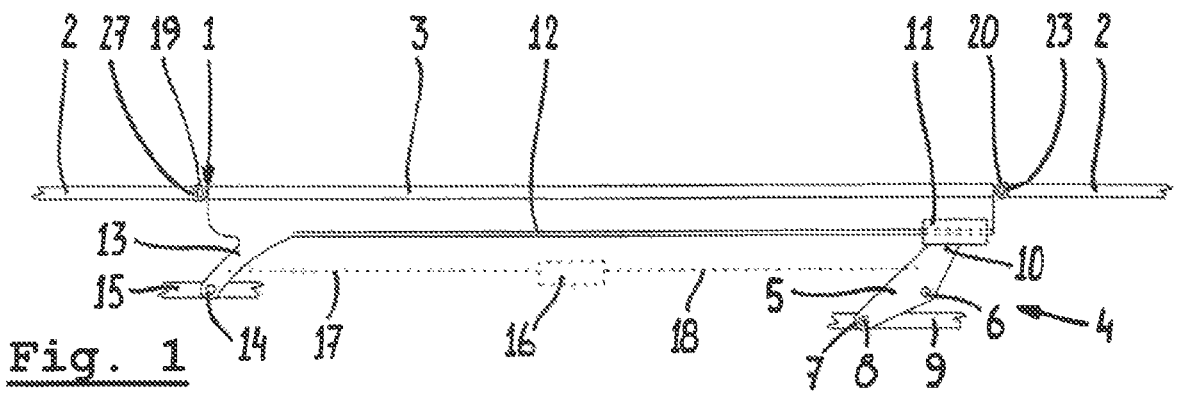
FIGS. 1-3, in schematic side elevational views, illustrate a first embodiment of an open roof construction in three different positions.
Figure 2:
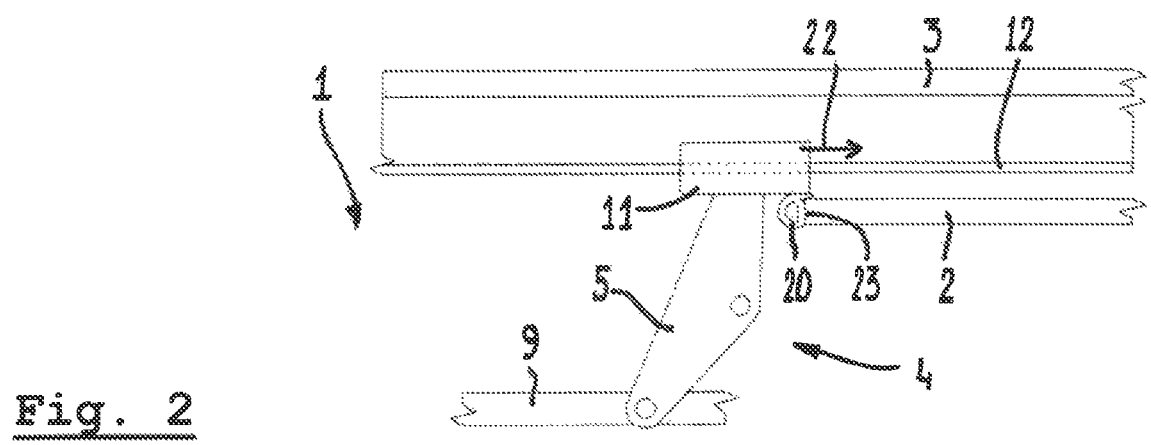
Figure 3:
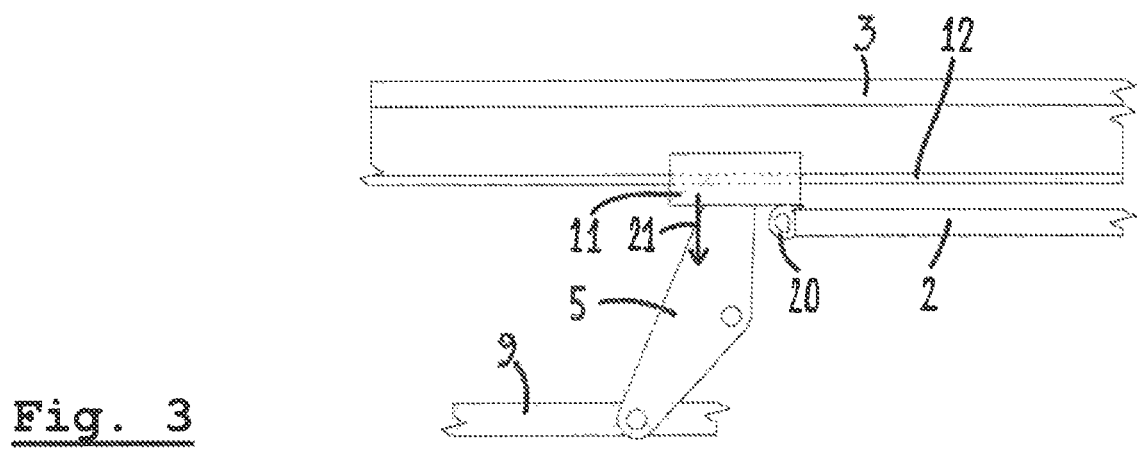

In FIGS. 1-3 a first embodiment of an open roof construction for a vehicle is illustrated. Only those components of such an open roof construction have been illustrated which are required for elucidating the merits of aspects of the invention, and in a manner for clarifying the constructional and functional relations between those components without intending to provide a precise and complete technical representation.

Referring to FIG. 1, the open roof construction comprises a roof opening 1 in a stationary roof part 2 and a panel 3 (for example a glass panel) which by an operating mechanism is movable between a closed position (FIG. 1) in which it closes the roof opening 1 and an open position (FIG. 3) in which the panel 3 is moved rearwards (in the figures to the right) to a position at least partially above a part of the stationary roof part 2 behind the roof opening 1. The operating mechanism comprises a rear moving assembly 4 comprising a lever 5 for moving, guiding and supporting the panel 3 (initially at a rear end). The lever 5 can move in a longitudinal direction of the vehicle and can rotate around a transverse axis 6 (the position of which may be fixed or not and, for example, may be defined by a curved track in which the axis can slide).

The lever 5 has a first end 7 which (for example through a slide shoe 8) can slide along a guide 9 for defining its movement in the longitudinal direction and a second end 10 provided with a sliding member 11 which in a sliding manner engages a track 12 which is part of the panel 3. The guide 9 may extend in a desired manner, i.e. in a straight line, curved or any combination thereof. It is also conceivable that the guide 9 is defined in a movable member.

In the illustrated embodiment the operating mechanism further comprises an arm 13 attached to a forward part of the panel 3 and engaging a curved track 15 (which likewise may extend in a straight line or curved or any combination thereof and which may be defined in a movable member) through a guide shoe 14. The curved track 15 and guide shoe 14 define components of a forward mechanism (which further may comprise other components not illustrated).

Illustrated schematically in broken lines is a drive member or slide 16 which is responsible for driving the forward mechanism and the rear moving assembly. This has been indicated schematically by broken lines 17 and 18 which represent driving connections between those components and the drive member 16. A movement of the drive member 16 (for example initiated by a push/pull cable not illustrated) causes the required succession of movements of all components, the details of which are not relevant for understanding the present invention and which may come in many different embodiments. It is only noted, that resulting from such movements the panel 3, starting from the closed position, firstly is lifted and next is moved over the stationary roof part 2 to its open position and vice versa.

There also are provided seals 19,20 that are positioned in the roof opening 1 in the region of longitudinal, forward and rearward roof opening edges and which are intended for cooperation with the panel 3. In the embodiment according to FIGS. 1-3 the seals 19,20 are directly attached to the respective roof opening edges 23,27.

The rear moving assembly is constructed such that, in the open position of the panel 3 as illustrated in FIG. 3, the sliding member 11 of the rear moving assembly 4 has come into engagement with the seal 20 that is positioned in the roof opening 1 in the region of the rearward roof opening edge 23. Specifically the rear moving assembly is constructed such that, in the open position of the panel, the sliding member 11 has deformed said seal 20 relative to a situation in which said seal does not engage the panel 3 (nor any other component apart from the edge to which it is connected).

The rear moving assembly 4 is constructed such that the engagement between the sliding member 11 and the seal 20 is caused by a substantially linear movement of the sliding member 11 towards said seal, wherein specifically in the present embodiment said linear movement occurs substantially orthogonally to a contact surface to be created between the sliding member 11 and said seal 20 as a result of such a linear movement (in accordance with arrow 21 in FIG. 3) such as to prevent frictional forces and wear. Before such a linear movement occurs, the rear moving assembly will move the sliding member 11 above the seal 20 without yet engaging it (in accordance with arrow 22 in FIG. 2 which thus does not represent the movement of the sliding member 11 relative to the panel 3, which occurs in the opposite sense, but the movement of the sliding member 11 relative to the seal 20).

Figure 4:
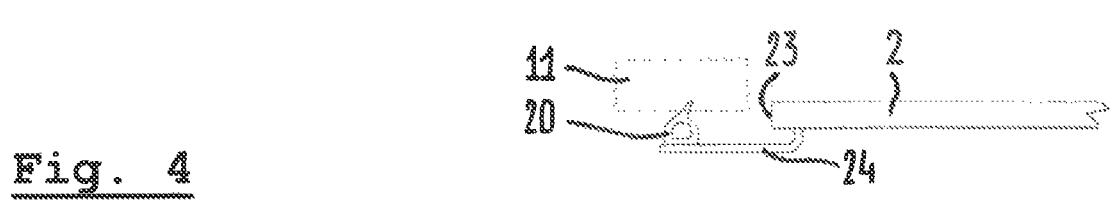
FIG. 4 shows an alternative position of a seal.

In FIG. 4 an embodiment has been illustrated in which the seal 20 is spaced slightly from the respective rear roof opening edge 23 (for example mounted on a brace 24).

Figure 5:
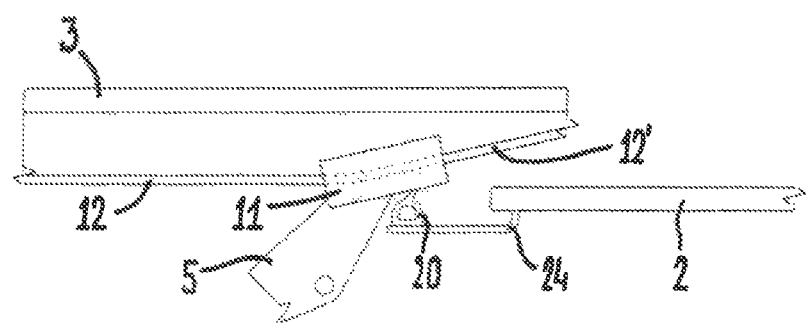
FIG. 5, in a schematic side elevational view, illustrates part of a second embodiment of an open roof construction.

FIG. 5 illustrates an alternative embodiment, in which the rear moving assembly is constructed such that the engagement between the sliding member 11 and said seal 20 is caused by a rotational movement of the sliding member 11 (which may occur after a position has been reached according to FIG. 2) for assuring that at the start of the engaging process the part of the sliding member 11 which will engage said seal 20 moves substantially orthogonally to a contact surface to be created between said part and the seal 20 as a result of such a rotational movement. For causing such a rotation one option would be to shape the track 12 in such a manner that the sliding member 11, when sliding along a section 12' of said track, is rotated as desired. However, also other drives may be used.

Figure 6:
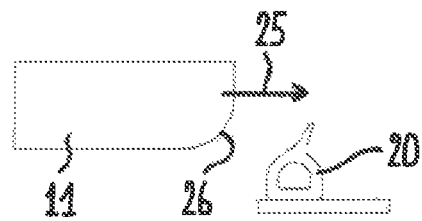
FIG. 6, in a schematic side elevational view, illustrates part of a third embodiment of an open roof construction.

Finally referring to FIG. 6 part of a third embodiment is illustrated (specifically only the sliding member 11 and seal 20 are illustrated) in which the rear moving assembly is constructed such that the engagement between the sliding member 11 and the seal 20 is caused by a substantially linear movement (arrow 25) of the sliding member 11 towards and into engagement with said seal 20 without a previous movement above and still out of engagement with the seal. Generally, in this embodiment the engagement movement will not occur orthogonally to a contact surface to be created between the sliding member 11 and said seal 20 as a result of such a linear movement, and thus the sliding member 11 will be provided with means for assuring a gradual engagement with the seal without an undue amount of friction or wear. These means, for example, may comprise at least one inclined, rounded or bevelled edge 26 with which the sliding member will engage the seal and which prevents damage to the seal.

Figure 7:
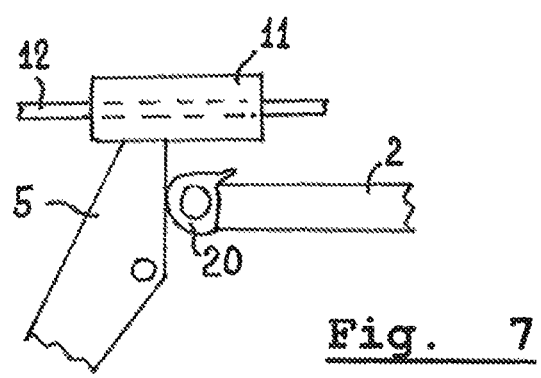
FIG. 7, in a schematic side elevational view, illustrates part of a fourth embodiment of an open roof construction.
Figure 8:
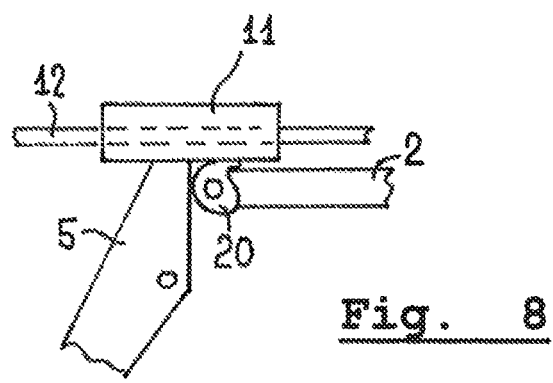
FIG. 8, in a schematic side elevational view, illustrates part of a fifth embodiment of an open construction.

The invention is not limited to the embodiments described before which may be varied widely within the scope of the invention as defined by the appending claims. For example it is conceivable that not the sliding member 11, but the lever 5 (as illustrated in FIG. 7) or the lever 5 and the sliding member 11 together (as illustrated in FIG. 8) or even another component of the rear moving assembly defines the part which will engage the seal. For example such a component also may be a brace of the panel which is engaged by the lever or sliding member and which is considered a part of the rear moving assembly. The required movement of the lever 5 and/or sliding member 11 (or other component) for assuring a correct engagement of the seal 20 (linear, rotating or both), among others, also (completely or in part) may be obtained by appropriately shaping the curved track 15 which thus (alone or in combination with other components) may cause the required movements of the sliding member and/or lever.

The type of mounting of the open roof construction to the vehicle (top loaded or bottom loaded) may vary too.

What is claimed is:

1. An open roof construction for a vehicle, comprising:
   a stationary roof part having a roof opening;
   a panel;
   one or more seals positioned in the roof opening in the region of roof opening edges and which cooperate with the panel; and
   an operating mechanism configured to move the panel between a closed position in which the panel closes the roof opening and an open position in which the panel is moved rearwards to a position at least partially above a part of the stationary roof part behind the roof opening, the operating mechanism comprising:
      a rear moving assembly configured to guide and support the panel, wherein the rear moving assembly is constructed such that, in the open position of the panel, part of the rear moving assembly comes into engagement with a seal that is positioned in the roof opening in the region of a rearward roof opening edge, wherein the engagement between said part of the rear moving assembly and said seal is caused by a substantially linear movement of said part of the rear moving assembly towards said seal, and said linear movement occurs substantially orthogonally to a contact surface to be created between said part of the rear moving assembly and said seal as a result of such a linear movement.

2. The open roof construction according to claim 1, wherein the rear moving assembly is constructed such that, in the open position of the panel, said part of the rear moving assembly has deformed said seal relative to a situation in which said seal does not engage the panel.

3. The open roof construction according to claim 1, wherein the part of the rear moving assembly which will engage said seal first is provided with means for assuring a gradual engagement between said part and said seal.

4. The open roof construction according to claim 3, wherein said means comprise at least one inclined, rounded or bevelled edge of said part of the rear moving assembly.

5. The open roof construction according to claim 3, wherein the panel includes a track, and wherein the rear moving assembly comprises a lever configured to guide and support the panel, which lever is configured to move in a longitudinal direction of the vehicle and rotates around a transverse axis, said lever having a first end which slides along a guide configured to define movement of the first end in the longitudinal direction and a second end provided with a sliding member which in a sliding manner engages the track of the panel, and wherein said part of the rear moving assembly engaging the seal comprises the sliding member.

6. The open roof construction according to claim 1, wherein the rear moving assembly is constructed such that the engagement between said part of the rear moving assembly and said seal is caused by a rotational movement of said part for assuring that at a start of the engagement the part of the rear moving assembly which engages said seal moves substantially orthogonally to a contact surface to be created between said part of the rear moving assembly and said seal as a result of said rotational movement.

7. The open roof construction according to claim 6, wherein the panel includes a track, and wherein the rear moving assembly comprises a lever configured to guide and support the panel, which lever moves in a longitudinal direction of the vehicle and rotates around a transverse axis, said lever having a first end which slides along a guide configured to define movement of the first end in the longitudinal direction and a second end provided with a sliding member which in a sliding manner engages the track of the panel, and wherein said part of the rear moving assembly comprises the sliding member.

8. The open roof construction according to claim 7, wherein the track is shaped such that the sliding member, when sliding along said track, is rotated.

9. The open roof construction according to claim 6, wherein the panel includes a track, and wherein the rear moving assembly comprises a lever configured to guide and support the panel, which lever moves in a longitudinal direction of the vehicle and rotates around a transverse axis, said lever having a first end which can slide along a guide configured to define movement of the first end in the longitudinal direction and a second end provided with a sliding member which in a sliding manner engages the track of the panel, and wherein said part of the rear moving assembly comprises the lever.

10. The open roof construction according to claim 9, wherein the guide along which the first end of the lever slides is shaped for causing the rotation of the lever.

11. The open roof construction according to claim 9, wherein said seal is attached to the rearward roof opening edge.

12. The open roof construction according to claim 9, wherein said seal is spaced from the rearward roof opening edge.

13. The open roof construction according to claim 3, wherein the panel includes a track, and wherein the rear moving assembly comprises a lever configured to guide and support the panel, which lever is configured to move in a longitudinal direction of the vehicle and rotates around a transverse axis, said lever having a first end which slides along a guide configured to define movement of the first end in the longitudinal direction and a second end provided with a sliding member which in a sliding manner engages the track of the panel, and wherein said part of the rear moving assembly engaging the seal comprises the lever.

14. The open roof construction according to claim 3, wherein the panel includes a track, and wherein the rear moving assembly comprises a lever configured to guide and support the panel, which lever is configured to move in a longitudinal direction of the vehicle and rotates around a transverse axis, said lever having a first end which slides along a guide configured to define movement of the first end in the longitudinal direction and a second end provided with a sliding member which in a sliding manner engages the track of the panel, and wherein said part of the rear moving assembly engaging the seal comprises the sliding member and the lever.

15. An open roof construction for a vehicle, comprising:
a stationary roof part having a roof opening;
a panel;
one or more seals positioned in the roof opening in the region of roof opening edges and which cooperate with the panel; and
an operating mechanism configured to move the panel between a closed position in which the panel closes the roof opening and an open position in which the panel is moved rearwards to a position at least partially above a part of the stationary roof part behind the roof opening, the operating mechanism comprising:
a rear moving assembly configured to guide and support the panel, wherein the rear moving assembly is constructed such that, in the open position of the panel, part of the rear moving assembly comes into engagement with a seal that is positioned in the roof opening in the region of a rearward roof opening edge, wherein the part of the rear moving assembly which will engage said seal first is provided with means for assuring a gradual engagement between said part and said seal, wherein the panel includes a track, and wherein the rear moving assembly comprises a lever configured to guide and support the panel, which lever is configured to move in a longitudinal direction of the vehicle and rotates around a transverse axis, said lever having a first end which slides along a guide configured to define movement of the first end in the longitudinal direction and a second end provided with a sliding member which in a sliding manner engages the track of the panel, and wherein said part of the rear moving assembly engaging the seal comprises at least one of the sliding member and the lever.

16. The open roof construction according to claim 15, wherein the part of the rear moving assembly comprises the sliding member.

17. The open roof construction according to claim 15, wherein the part of the rear moving assembly comprises the lever.

18. The open roof construction according to claim 15, wherein the part of the rear moving assembly comprises the sliding member and the lever.

19. An open roof construction for a vehicle, comprising:
a stationary roof part having a roof opening;
a panel;
one or more seals positioned in the roof opening in the region of roof opening edges and which cooperate with the panel; and
an operating mechanism configured to move the panel between a closed position in which the panel closes the roof opening and an open position in which the panel is moved rearwards to a position at least partially above a part of the stationary roof part behind the roof opening, the operating mechanism comprising:
a rear moving assembly configured to guide and support the panel, wherein the rear moving assembly is constructed such that, in the open position of the panel, part of the rear moving assembly comes into engagement with a seal that is positioned in the roof opening in the region of a rearward roof opening edge, wherein the rear moving assembly is constructed such that the engagement between said part of the rear moving assembly and said seal is caused by a rotational movement of said part for assuring that at a start of the engagement the part of the rear moving assembly which engages said seal moves substantially orthogonally to a contact surface to be created between said part of the rear moving assembly and said seal as a result of said rotational movement, and wherein the panel includes a track, and wherein the rear moving assembly comprises a lever configured to guide and support the panel, which lever moves in a longitudinal direction of the vehicle and rotates around a transverse axis, said lever having a first end which slides along a guide configured to define movement of the first end in the longitudinal direction and a second end provided with a sliding member which in a sliding manner engages the track of the panel, and wherein said part of the rear moving assembly comprises the sliding member.

20. The open roof construction according to claim 7, wherein the track is shaped such that the sliding member, when sliding along said track, is rotated.

\* \* \* \* \*